United States Patent [19]
[11] 3,707,941
[45] Jan. 2, 1973
Kunishige et al.

[54] CHANNEL INDICATING MEANS FOR TELEVISION RECEIVERS

[75] Inventors: Hidenori Kunishige, Moriguchi; Kosaku Uchida, Neyagawa, both of Japan

[73] Assignee: Matsushita Electric Industrial Co., Ltd., Osaka, Japan

[22] Filed: Oct. 15, 1971

[21] Appl. No.: 189,529

[30] Foreign Application Priority Data

Oct. 20, 1970 Japan ..............................45/104865

[52] U.S. Cl. ....................116/124.4, 40/14, 116/129, 325/464, 334/86

[51] Int. Cl. ............................................H03j 1/04

[58] Field of Search.....29/161; 40/20 A, 26, 331, 14, 40/19.5; 74/553; 116/124.1, 124.2, 124.3, 124.4, 133, 129; 325/455, 464, 465; 334/50, 86, 87

[56] References Cited

UNITED STATES PATENTS

| | | | |
|---|---|---|---|
| 237,643 | 2/1881 | Uhler | 40/14 X |
| 2,257,022 | 9/1941 | Pressley | 116/129 R |
| 2,817,914 | 12/1957 | Rosen | 40/5 X |
| 2,942,108 | 6/1960 | Goldstein et al. | 116/124.1 |

*Primary Examiner*—Louis J. Capozi
*Attorney*—Stevens, Davis, Miller & Mosher

[57] ABSTRACT

A channel indicating means for television receivers, which comprises a movable, for instance rotatable, channel indicating body interlocked to the channel selector and carrying channel indicating members such as cards bearing numeral prints removably attached to it. It is possible to change the channel indication very easily.

6 Claims, 8 Drawing Figures

PATENTED JAN 2 1973

3,707,941

SHEET 1 OF 3

CHANNEL INDICATING MEANS FOR TELEVISION RECEIVERS

This invention relates to channel indicating means for television receivers.

In the usual television receivers, the VHF channel is clearly indicated by a numeral, but the UHF channel is indicated as the corresponding position of a pointer on a scale.

First of all, a brief description will be made with respect to the accompanying drawings, in which;

FIGS. 1*a* and 1*b* are front views showing a channel indicating means of a usual television receiver;

Figure 1A:
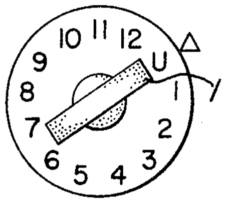
FIG. 1a PRIOR ART
Figure 1B:
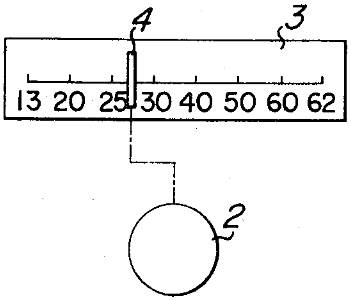
FIG. 1b PRIOR ART

With the usual channel indicating means, the tuning to a desired UHF channel is done by first setting the VHF knob 1 to the position U as shown in FIG. 1*a* and then turning the UHF knob 2 until the pointer 4 comes to a position on the UHF channel indicating scale 3 corresponding to the desired UHF channel.

As is seen, the tuning to a UHF channel, unlike the tuning to a VHF channel, is done in two steps. Also, the channel indicating means itself is complicated.

Further, since the UHF channel tuned is indicated as only the position of the pointer on the UHF channel indicating scale, the recognition of the UHF channel tuned is not so easy as in the case of VHF channels.

The invention is centered on this aspect, and it has an object of providing a channel indicating means comprising a movable channel indicating body interlocked to the channel selector and carrying channel indicating members bearing the print of channel numbers removably attached to the body so that it is possible to change the channel indication.

Another object of the invention is to facilitate the replacement of channel indicating members and ensure reliable fitting of the channel indicating members.

According to the invention, there is provided a channel indicating means comprising a channel selector, a movable channel indicating body interlocked to said channel selector and provided with a holding member formed with a plurality of slots and claw members of a resilient material, and channel indicating members each having a recessed portion at one end and a projecting portion at the other end, each of said channel indicating members being removably attached to said channel indicating body with said projecting portion received in a corresponding slot formed in said holding member and said recessed portion engaged with a corresponding one of said claw members and urged thereby toward said holding member.

In order that the invention may be fully understood, an embodiment thereof will now be described.

Figure 2:
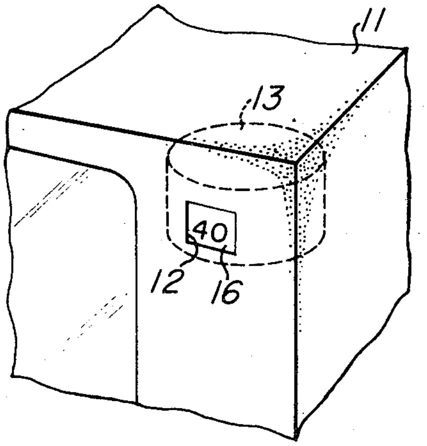
FIG. 2 is a fragmentary perspective view of a television receiver provided with an embodiment of the channel indicating means according to the invention.
Figure 3:
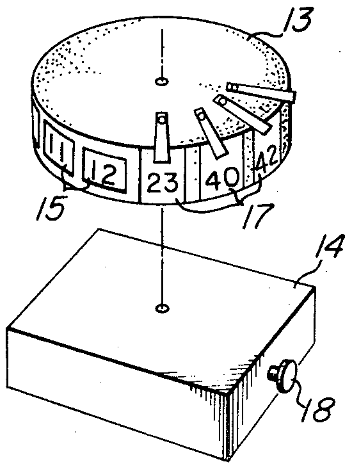
FIG. 3 is a perspective view of the channel indicating means shown in FIG. 2.

Referring now to FIGS. 2 and 3, reference numeral 11 designates an enclosure of a television receiver, which is provided with a channel indicating window 12. Numeral 13 designates a channel indicating rotary body according to the invention. It is interlocked to a channel selector 14 by means of gear's belts or other for selectively indicating specific UHF channels and VHF channels. As shown in FIG. 2, the rotary body 13 is accommodated within the enclosure 11. VHF channel indicating numerals as shown at 15 are imprinted on part of the periphery of the rotary body 13 at positions corresponding to respective VHF channel selecting positions. UHF channel indicating members 17 indicating specific UHF numbers are removably attached to the rotary body on the other part of its periphery at positions corresponding to respective UHF channel selecting positions through attachment means to be described hereinafter. The numbers for the VHF and UHF channels appear at the window 12 provided on the front panel of the enclosure 11 when the rotary body 13 assumes respective channel selecting positions. For example, the positions of VHF channels, for instance channels 1 to 12 in Japan, and the positions, of which number is predetermined, of UHF channels are uniformly spaced over the periphery of the rotary body 13, and may be selectively brought into alignment with the window 12 by manipulating a channel selecting knob or button (not shown). The UHF channels capable of reception in an area are made selectable when the respective UHF channel positions come to face the window by appropriately presetting by a presetting knob 18 provided to the channel selector 14. It is very convenient if the numerals representing the respective VHF channels 1 to 12 are previously printed on the rotary body 13.

Figure 4:
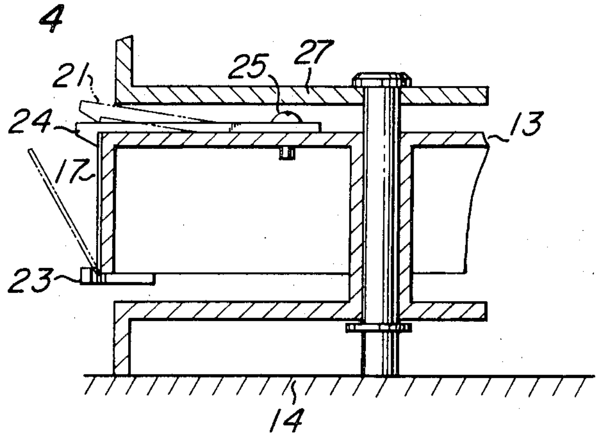
FIG. 4 is a fragmentary sectional view, to an enlarged scale, of the same.
Figure 5:
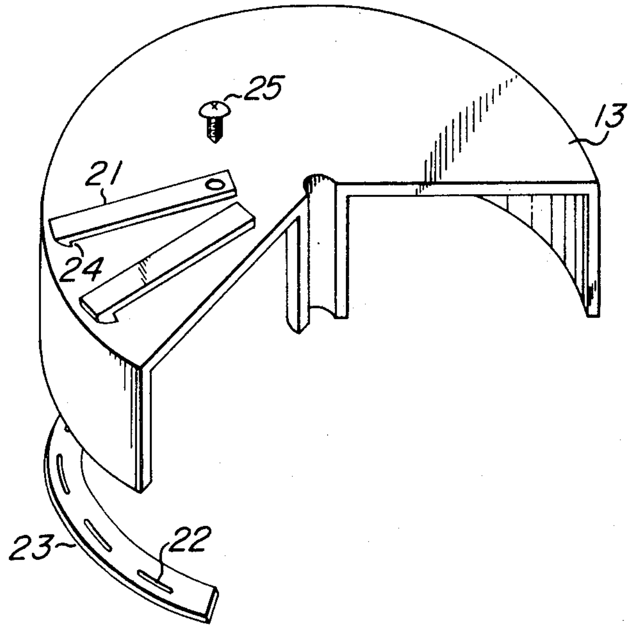
FIG. 5 is an exploded perspective view, to an enlarged scale, of part of the same.
Figure 6:
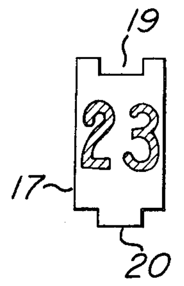
FIG. 6 is a front view of a channel indicating card.

FIGS. 4 and 5 shows the detailed construction of the rotary body 13. It is rotatably supported by means of frame 27 within the enclosure 11 of the television receiver such that it can be rotated step by step. It has uniformly spaced stop positions equal in number to the number of receivable channels. It is provided with a holding member 23 secured to its bottom and formed with a plurality of slots 22 corresponding in number to the number of receivable UHF channels. It is also provided with claw members 21 corresponding in number to the number of receivable UHF positions. The claw members 21 are made of a resilient material and secured on to the top of the rotary body 13 by bolts 25. They extend radially, and their free end is formed with a hook 24 which has a tapered portion as shown in FIG. 4 and in alignment with the corresponding slot 22 formed in the holding member. The rotary body 13 provided with the holder member and claw members can carry channel indicating members such as typically shown in FIG. 6. The channel indicating member 17 shown in FIG. 6 has an upper recessed portion 19 and a lower projecting portion 20. It is removably installed on the rotary body 13 with the projecting portion 20 received in the corresponding slot 22 formed in the holding member 23 and the recessed portion engaged by the corresponding claw member 21 and urged thereby toward the holding member. The hook 24 at the free end of each claw member 21 serves to prevent the detachment of the associated channel indicating member 17.

With the above construction, each channel indicating member 17 can be fitted on the rotary body at the position for the UHF channel indicated by it by inserting the projected portion 20 into the associated slot 22 in the holding member 23 and then lightly pushing its central portion by finger thereby causing the associated claw member 21 to be raised by virtue of the tapered portion and resiliency of the claw member and received in the recessed portion 19. When the claw member 21 is received in the recessed portion 19, it urges the channel indicating member 17 toward the holding member 23 to hold it in position. The hook 24 of the claw member 21 prevents the detachment of the channel indicating member 17. The recessed portion 19 prevents the channel indicating member 17 from tilting toward right or left. To remove the channel indicating member 17, the hook 24 of the claw member 21 is lightly raised by the finger, whereby the indicating member 17 tilts toward the operator and can be removed easily.

As has been described, according to the invention the channel indicating members 17 can be easily fitted on the rotary body at positions corresponding to the UHF channels indicated by them, so that the receivable UHF channels can be definitely indicated. Also, since the VHF channel numbers may be previously printed on part of the periphery of the rotary body 13 and the channel indicating members 17 are attached to the other part of the periphery, both the UHF and VHF channels can be indicated by a single channel indicating body, which is very economical.

Figure 7:
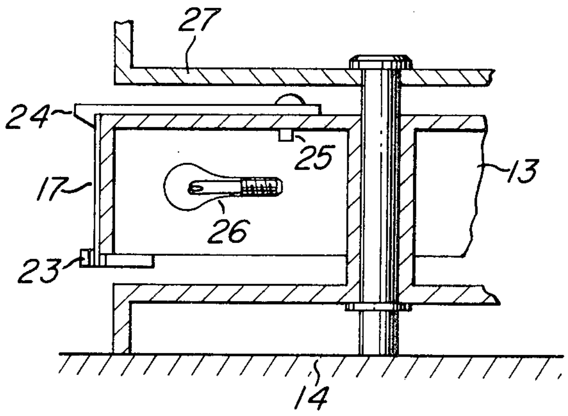
FIG. 7 is a view similar to FIG. 4 showing another embodiment of the channel indicating means according to the invention.

While in the preceding embodiment a rotary body is used as the channel indicating body, it may be replaced with a strip-like movable body. Also, the indication of the channel may be made through light from a light source 26 disposed within the rotary body 13, as shown in FIG. 7. In this case, it is necessary to make the channel indicating member 17 from a transparent or semi-transparent material and the rotary body 13 from a transparent material, or apertures may be formed in the rotary body at positions where the channel indicating members 17 are attached.

What we claim is:

1. A channel indicating means for television receivers comprising a channel selector, a movable channel indicating body interlocked to said channel selector and provided with a holding member formed with a plurality of slots and resilient claw members with a hook, and channel indicating members each having a projecting portion at one end, each of said channel indicating members being removably attached to said channel indicating body with said projecting portion received in a corresponding one of said slots formed in said holding member and the portion of the other end engaged by a corresponding one of said claw members and urged thereby toward said holding member.

2. The channel indicating means for television receivers according to claim 1, wherein VHF channel numbers are printed on said movable channel indicating body at positions for the reception of corresponding VHF channels, and said channel indicating members are fitted on said movable channel indicating body at positions for the reception of UHF channels indicated by said respective channel indicating members.

3. The channel indicating means for television receivers according to claim 1, wherein said movable channel indicating body is a cylindrical rotary body, said claw members are each secured at one end to the top of said rotary body, radially extend from the center of said top, and have said hook at the other end.

4. A channel indicating means for television receivers according to claim 1, wherein said channel indicating members are provided with a recessed portion at the end which is the opposite portion to said projecting portion for engaging said resilient claw members inserted therein and preventing for said channel indicating members to be tilted.

5. The channel indicating means for television receivers according to claim 1, said channel indicating members are made of a transparent or semi-transparent material and adapted to be illuminated from a light source.

6. The channel indicating means for television receivers according to claim 1, wherein said claw members each have a tapered hook at the free end so that said channel indicating members may be fitted by inserting said projecting portion into said slots formed in said holding member and pushing said channel indicating members toward said movable channel indicating body to cause said resilient claw members to be raised by virture of the resiliency.

* * * * *